(12) United States Patent
Yoshikawa et al.

(10) Patent No.: US 7,549,674 B2
(45) Date of Patent: Jun. 23, 2009

(54) OCCUPANT PROTECTION SYSTEM

(75) Inventors: Hiromichi Yoshikawa, Hikone (JP); Yasuo Itoga, Hikone (JP)

(73) Assignee: Takata Corporation, Tokyo (JP)

( * ) Notice: Subject to any disclaimer, the term of this patent is extended or adjusted under 35 U.S.C. 154(b) by 176 days.

(21) Appl. No.: 11/055,347

(22) Filed: Feb. 10, 2005

(65) Prior Publication Data

US 2005/0173898 A1 Aug. 11, 2005

(30) Foreign Application Priority Data

Feb. 10, 2004 (JP) ............... 2004-033701
Dec. 24, 2004 (JP) ............... 2004-373959

(51) Int. Cl.
B60R 21/207 (2006.01)
(52) U.S. Cl. .............. 280/740; 280/728.1; 280/730.1; 280/729
(58) Field of Classification Search ........... 280/729, 280/730.2, 748, 733, 740, 743.2, 730.1
See application file for complete search history.

(56) References Cited

U.S. PATENT DOCUMENTS

| | | | | |
|---|---|---|---|---|
| 4,262,931 A | * | 4/1981 | Strasser et al. | 280/729 |
| 4,965,899 A | * | 10/1990 | Sekido et al. | 297/284.6 |
| 5,082,326 A | | 1/1992 | Sekido et al. | |
| 5,464,250 A | * | 11/1995 | Sato | 280/743.1 |
| 5,845,935 A | * | 12/1998 | Enders et al. | 280/743.2 |
| 5,848,805 A | * | 12/1998 | Sogi et al. | 280/743.2 |
| 5,899,490 A | * | 5/1999 | Wipasuramonton et al. | 280/730.2 |
| 5,967,551 A | * | 10/1999 | Newkirk et al. | 280/740 |
| 6,089,599 A | * | 7/2000 | Schimmoller et al. | 280/740 |
| 6,099,028 A | * | 8/2000 | Seifert | 280/728.3 |
| 6,364,348 B1 | * | 4/2002 | Jang et al. | 280/730.2 |
| 6,439,605 B2 | * | 8/2002 | Ariyoshi | 280/739 |
| 6,536,800 B2 | * | 3/2003 | Kumagai et al. | 280/743.1 |
| 6,896,325 B2 | * | 5/2005 | Takedomi et al. | 297/216.1 |
| 7,021,655 B2 | * | 4/2006 | Saiguchi et al. | 280/733 |
| 2004/0163872 A1 | * | 8/2004 | Lincoln et al. | 180/271 |
| 2004/0178616 A1 | * | 9/2004 | Yoshikawa | 280/748 |
| 2005/0173899 A1 | * | 8/2005 | Korechika | 280/730.1 |

FOREIGN PATENT DOCUMENTS

DE 202004002874 U1 8/2004
JP 05229378 9/1993

(Continued)

*Primary Examiner*—John Q. Nguyen
*Assistant Examiner*—Timothy Wilhelm
(74) *Attorney, Agent, or Firm*—Fitch, Even, Tabin & Flannery

(57) ABSTRACT

An occupant protection system is provided in which parts along the length of the airbag inflate substantially at the same time. The occupant protection system includes an airbag inflatable on a seat pan such that it pushes the front of a seat cushion upward and a gas generator for inflating the airbag. The airbag extends along the lateral width of the seat. The airbag includes a partition panel extending along the length of the airbag therein. In one form, the partition panel partitions the interior of the airbag into a first chamber and a second chamber which extend from one longitudinal end of the airbag to the other end. The gas generator is disposed in the first chamber. The partition panel has communication holes for communicating the first chamber with the second chamber.

10 Claims, 13 Drawing Sheets

FOREIGN PATENT DOCUMENTS

| | | |
|---|---|---|
| JP | 10217818 | 8/1998 |
| JP | 2002079861 | 3/2002 |
| JP | 2002079862 | 3/2002 |
| JP | 2002079863 | 3/2002 |
| JP | 2002145002 | 5/2002 |
| JP | 2003312439 | 11/2003 |
| WO | WO 03/049977 A2 | 6/2003 |

* cited by examiner

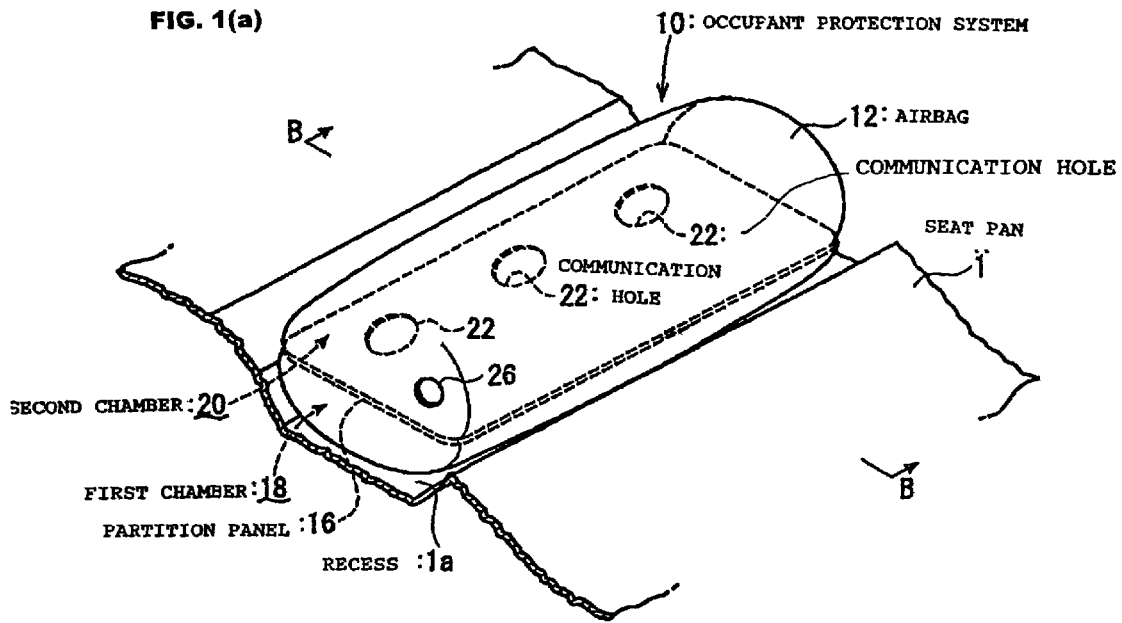
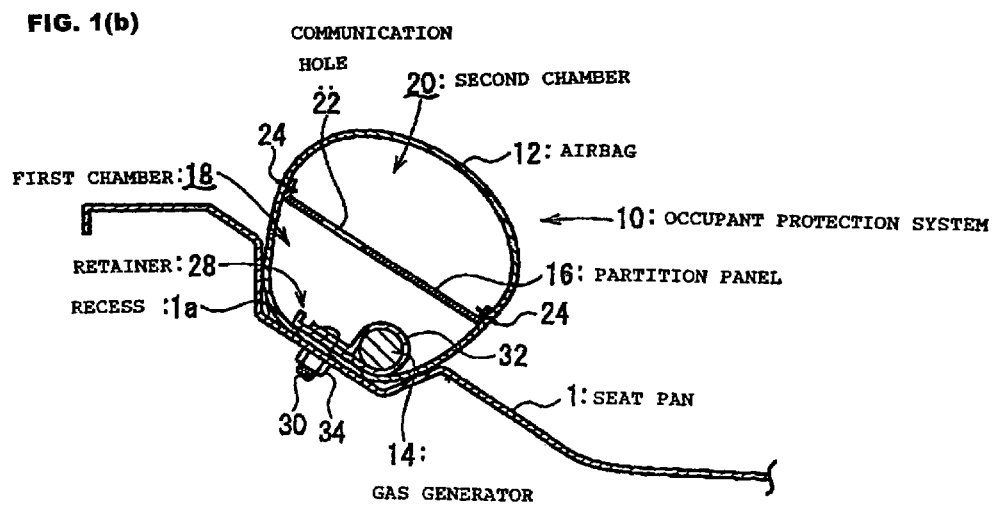

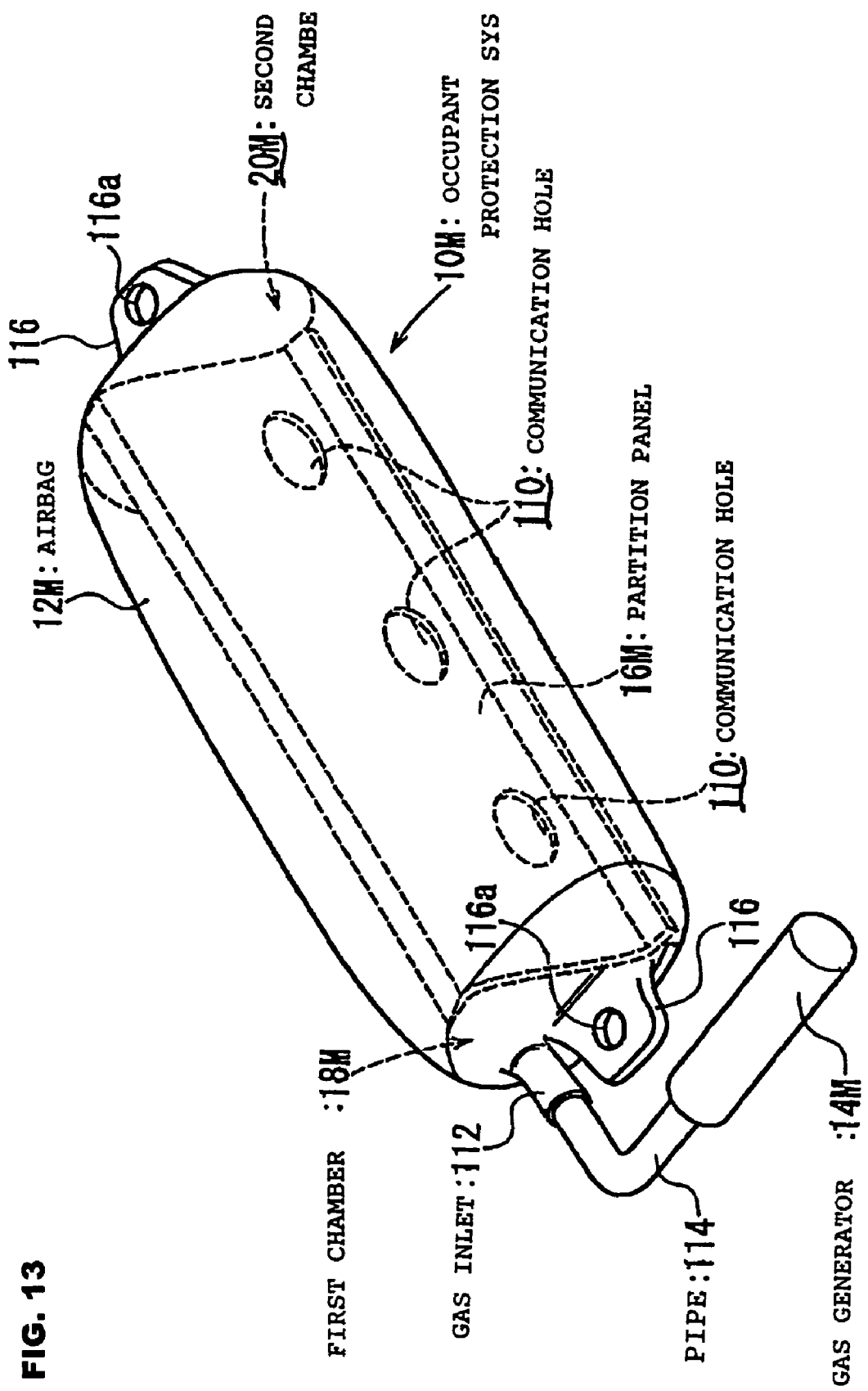

OCCUPANT PROTECTION SYSTEM

FIELD OF THE INVENTION

The present invention relates to an occupant protection system for protecting an occupant of a vehicle such as a car in the event of a collision and, more particularly, it relates to an occupant protection system for preventing the body of the occupant from moving forward and downward by restraining the waist of the occupant during a front collision.

BACKGROUND OF THE INVENTION

As a system for protecting an occupant in the event of a car collision, Japanese Unexamined Patent Application Publication Nos. 2002-79861, 2002-79862, and 2002-145002 describe occupant protection systems in which an inflatable airbag is disposed between a seat cushion and a seat pan and the front of the seat cushion is pushed up by inflating the airbag in a car collision to prevent a so-called submarine phenomenon such that the occupant passes under a lap belt during a front crash even with a seat belt.

The occupant protection systems disclosed in Japanese Unexamined Patent Application Publication Nos. 2002-79861 and 2002-79862 have an inflator in the airbag and a cylindrical diffuser or a rectifier cloth so as to surround the inflator, with which gas from the inflator is diffused or the gas is guided toward the opposite ends of the airbag.

In the occupant protection system disclosed in Japanese Unexamined Patent Application Publication No. 2002-145002, a pipe extending along an airbag is passed through the airbag, in which gas is blown from an inflator disposed outside the airbag through the pipe into the airbag. The pipe has a plurality of gas ports at intervals along the length thereof.

In the conventional occupant protection systems, part of the airbag along the length thereof sometimes inflates early and the other part inflates late.

In the occupant protection systems described in Japanese Unexamined Patent Application Publication Nos. 2002-79861 and 2002-79862, for example, only the vicinity of the gas ports of the diffuser or rectifier cloth probably inflates earlier than the other part.

In the occupant protection system described in Japanese Unexamined Patent Application Publication Nos. 2002-145002, of the gas ports of the pipe, the vicinity of the gas ports adjacent to the inflator probably inflates earlier than the other part.

Accordingly, it is an object of the present invention to provide an occupant protection system in which the problems of the conventional examples are solved so that parts of the airbag along the length inflate substantially at the same time.

SUMMARY OF THE INVENTION

An occupant protection system according to one form of the present invention includes an airbag extending along the lateral width of a seat and inflatable so as to push the front of the seat cushion from below, and a gas generator for inflating the airbag in a car emergency. The airbag is partitioned into a plurality of chambers by a partition panel extending along the length of the airbag, of which a first chamber extends from one longitudinal end of the airbag to the other end, and the other chamber communicates with the first chamber. The gas generator is disposed to supply gas into the first chamber.

In an occupant protection system according to another form, the partition panel has a communicating portion for communicating the first chamber with the other chamber.

An occupant protection system according to one form further includes a gas passage between the longitudinal ends of the partition panel and the longitudinal ends of the airbag, for communicating the first chamber with the other chamber.

An occupant protection system according to other forms includes one or more other chambers.

In inflating the airbag of the occupant protection system according to the invention, gas is supplied to a first chamber extending from one longitudinal end to the other end of the airbag to inflate the first chamber first. Since the first chamber is smaller in volume than the entire airbag, the entire chamber inflates quickly and each part thereof inflates substantially at the same time. Then, the gas flows from the first chamber into the other chamber to inflate the entire airbag.

Accordingly, in the occupant protection system according to the invention, the first chamber inflates quickly. Since the other chamber has the remaining volume obtained by subtracting the volume of the first chamber from the volume of the entire airbag, it inflates relatively quickly and substantially at the same time entirely with the gas supplied from the first chamber.

With the occupant protection system according to one form, the inflation of the other chamber to be uniformized by appropriate arrangement and size of the communicating portions.

The communicating portion according to the invention may be an opening or a cutout in the partition panel or the clearance between the multiple partition panels or, alternatively, the partition panel may have gas permeability.

In the occupant protection system according to one form, the other chamber starts to inflate from the longitudinal ends of the airbag. Accordingly, when the gas from the gas generator is supplied into the first chamber, in the middle of the length of the airbag, the entire airbag including the longitudinal ends completes inflation substantially at the same time.

With the occupant protection system according to one form, when a large reaction force is applied partly to the inflated airbag from the seat cushion etc., the gas pressure in the other chamber to which the large reaction force is applied increases to reduce the depression of the vicinity of the other chamber.

BRIEF DESCRIPTION OF THE DRAWINGS

FIG. 1(a) is a perspective view of an occupant protection system according to an embodiment of the present invention; and FIG. 1(b) is a cross-sectional view taken along line B-B of FIG. 1(a).

FIG. 13 is a perspective view of an occupant protection system according to another embodiment.

DETAILED DESCRIPTION OF THE PREFERRED EMBODIMENTS

Figure 2A:
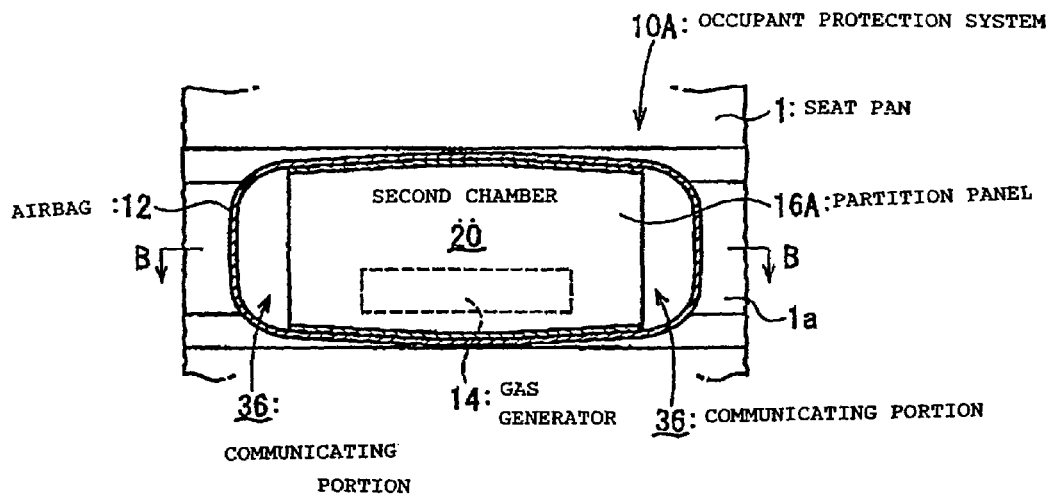
FIG. 2(a) is a horizontal sectional view of an airbag of an occupant protection system according to another embodiment.

Embodiments of the present invention will be described with reference to the drawings.

FIG. 1(a) is a perspective view of an occupant protection system according to an embodiment of the present invention; and FIG. 1(b) is a cross-sectional view taken along line B-B of FIG. 1(a).

A seat pan 1 is disposed under the seat cushion (not shown) of a seat mounted in a car. An inflatable airbag 12 of an occupant protection system 10 is disposed at the upper part of the front of the seat pan 1 (between the seat cushion and the seat pan 1).

The occupant protection system 10 includes an airbag 12 which is inflatable so as to push the front of the seat cushion upward on the seat pan 1 and a gas generator 14 for inflating the airbag 12. The airbag 12 extends along the lateral width of the seat (along the width of the vehicle).

The airbag 12 includes a partition panel 16 extending along the length of the airbag 12 (laterally) therein. The partition panel 16 partitions the interior of the airbag 12 into upper and lower chambers, a first chamber 18 and a second chamber 20, which extend from one end of the length of the airbag 12 toward the other end. The first chamber 18 is formed in the lower half of the airbag 12 (adjacent to the seat pan 1), while the second chamber 20 is formed in the upper half of the airbag 12 (adjacent to the seat cushion or the occupant). The gas generator 14 is disposed in the first chamber 18.

In the present invention, it is preferable that the volume of the first chamber 18 be smaller than that of the second chamber 20, or lower than 50 percent of the entire volume of the airbag 12.

The partition panel 16 includes multiple communication holes (openings) 22 for communicating the first chamber 18 with the second chamber 20. The communication holes 22 are disposed at regular intervals in different positions along the length of the airbag 12.

The partition panel 16 according to the embodiment is a substantially rectangular panel. The length of the partition panel 16 is substantially equal to that of the airbag 12. The partition panel 16 extends continuously from one longitudinal end of the airbag 12 to the other end. As shown in FIG. 1(b), the partition panel 16 extends in parallel with the upper surface of the seat pan 1 when the airbag 12 inflates on the seat pan 1. In this embodiment, the upper surface of the seat pan 1 inclines to rise forward.

The entire outer rim of the partition panel 16 is joined with the inner circumference of the airbag 12 by stitching etc. The mutual communication of gas between the first and second chambers 18 and 20 through the outer rim of the partition panel 16 and the inner circumference of the airbag 12 is cut off. Reference numeral 24 indicates a seam that connects the outer rim of the partition panel 16 with the inner circumference of the airbag 12.

According to the embodiment, the length of the short side of the partition panel 16 is smaller than the diameter (the length crossing the longitudinal direction) of the airbag 12 including no partition panel 16 when it is inflated. Therefore, when the airbag 12 including the partition panel 16 inflates, the separation of the diametrically opposing surfaces of the airbag 12 is restricted by the partition panel 16 and as such, the diametrical inflation amount of the airbag 12 (the volume of the entire airbag 12 in an inflated state) is decreased.

As shown in FIG. 1(a), a vent hole 26 for discharging the gas in the second chamber 20 to the exterior is disposed at one longitudinal end of the airbag 12.

As shown in FIG. 1(b), a retainer (airbag retaining member) 28 is disposed in the first chamber 18 at the lower part of the airbag 12. The retainer 28 is fixed to the seat pan 1 with stud bolts 30 and as such, the airbag 12 is retained to the seat pan 1. The gas generator 14 disposed in the first chamber 18 is connected to the retainer 28 with a bracket 32.

In this embodiment, a recess 1a for mounting the occupant protection system 10 is provided in the upper surface of the seat pan 1. The airbag 12 and the gas generator 14 are disposed in the recess 1a. The retainer 28 is in the form of a plate extending along the upper surface of the bottom of the recess 1a and pushes the bottom of the airbag 12 (the first chamber 18) from the inside to the upper surface of the bottom of the recess 1a. The stud bolts 30 project from the lower surface of the retainer 28. The stud bolts 30 are passed through respective bolt insertion holes (not shown) disposed in the bottom of the airbag 12 and the recess 1a, which are tighten with nuts 34, so that the retainer 28 is fixed to the seat pan 1, and the bottom of the airbag 12 is clamped between the retainer 28 and the seat pan 1 (the upper part of the bottom of the recess 1a).

The gas generator 14 is in the form of a rod and disposed so as to extend laterally (along the length of the airbag 12) in the first chamber 18 and fixed to the retainer 28 with the bracket 32. The gas generator 14 has gas ports (not shown) around the side circumference and, in operation, emits a jet of gas radially (in the direction of the diameter of the airbag 12) through the gas ports.

In this occupant protection system 10, when the front collision of a car is sensed by a sensor (not shown), the gas generator 14 emits a jet of gas to inflate the airbag 12 upward so as to increase the thickness (diameter), with the airbag 12 supported from below by the seat pan 1, as shown in FIG. 1(b). As a result, the front of the seat cushion is pushed up or hardened to prevent the forward movement of the occupant.

In inflating the airbag 12, the gas supplied from the gas generator 14 flows into the first chamber 18 which extends from one longitudinal end of the airbag 12 to the other end to inflate the first chamber 18 first. Since the volume of the first chamber 18 is smaller than the volume of the entire airbag 12, the entire airbag 12 inflates quickly, each part of which inflates substantially at the same time. Then the gas flows from the first chamber 18 into the second chamber 20 through the communication holes 22 to inflate the entire airbag 12.

In the occupant protection system 10, the first chamber 18 inflates quickly. The second chamber 20 has a volume obtained by subtracting the volume of the first chamber 18 from the volume of the entire airbag 12 and so inflates relatively quickly and substantially at the same time by the gas supplied from the first chamber 18.

Particularly, the first chamber 18 of the occupant protection system 10 extends from the left end of the airbag 12 to the right end. Accordingly, as the first chamber 18 inflates laterally quickly, the entire airbag 12 also inflates quickly to the lateral ends.

In the occupant protection system 10 of FIGS. 1(a) and 1(b), the first chamber 18 and the second chamber 20 are communicated with each other through the communication holes (openings) 22 provided in the partition panel 16. However, it is to be understood that the structure of the communicating portion for communicating the first chamber 18 with the second chamber 20 is not limited to that.

Referring to FIGS. 2(a)-3(b), another structure of the communicating portion will be described.

Figure 2B:
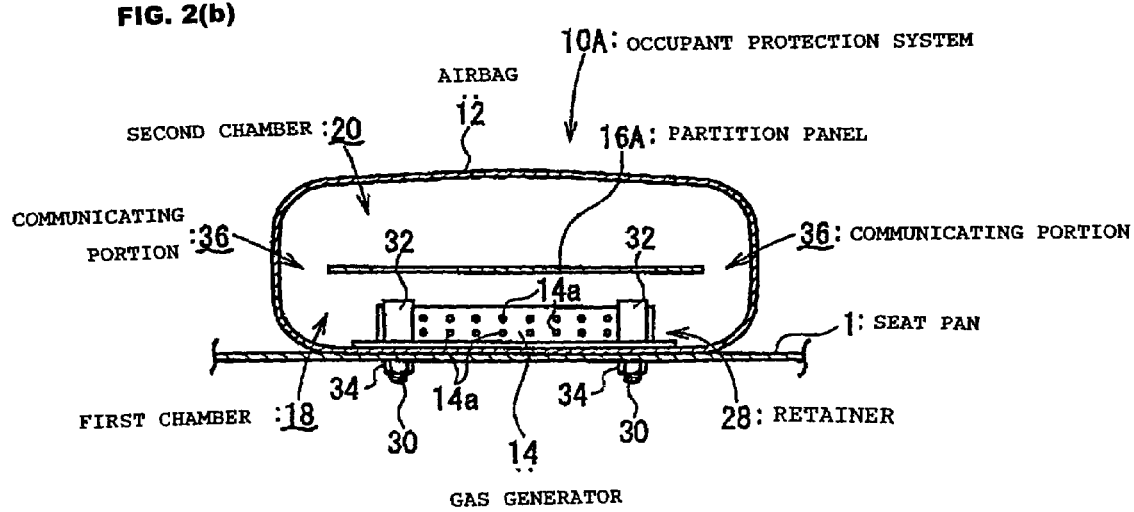
FIG. 2(b) is a cross-sectional view taken along line B-B of FIG. 2(a).

FIG. 2(a) is a horizontal sectional view of an airbag including a communicating portion according to another embodiment; and FIG. 2(b) is a cross-sectional view taken along line B-B of FIG. 2(a).

In an occupant protection system 10A shown in FIGS. 2(a) and 2(b), the airbag 12 includes a partition panel 16A which connects diametrically opposing surfaces of the airbag 12 with each other therein. As shown in the drawings, the partition panel 16A extends laterally (along the length of the airbag 12) continuously. The lateral length of the partition panel 16A is smaller than that of the airbag 12. The lateral ends of the partition panel 16A are a specified distance apart from the inner circumferences of the right and left ends of the airbag 12.

The clearances between the lateral ends of the partition panel 16A and the inner circumferences at the lateral ends of the airbag 12 serve as communicating portions (gas communicating spaces) 36 for communicating the first chamber 18 formed under the partition panel 16A and the second chamber 20 formed thereon with the partition panel 16A inbetween.

In this embodiment, the gas generator 14 is disposed in the middle of the lateral length of the first chamber 18. Reference numeral 14a indicates a gas port disposed around the side circumference of the gas generator 14.

Other structures of the occupant protection system 10A are the same as those of the occupant protection system 10 in FIGS. 1(a) and 1(b).

In this occupant protection system 10A, when the gas generator 14 emits a jet of gas, the gas from the gas generator 14 flows into the first chamber 18 to inflate the first chamber 18 first. At that time, the gas from the gas generator 14 flows from the middle of the lateral length of the first chamber 18 toward the lateral ends. The gas then flows through the communicating portions 36 at the lateral ends into the second chamber 20 to inflate the second chamber 20. Thus, the entire airbag 12 including the longitudinal ends of the airbag 12 completes inflation substantially at the same time.

Figure 3A:
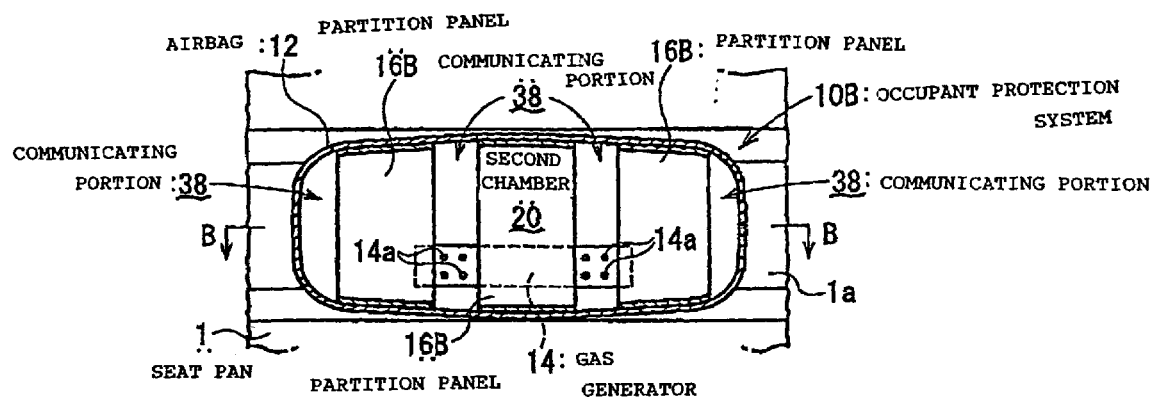
FIG. 3(a) is a horizontal sectional view of an airbag of an occupant protection system according to another embodiment.
Figure 3B:
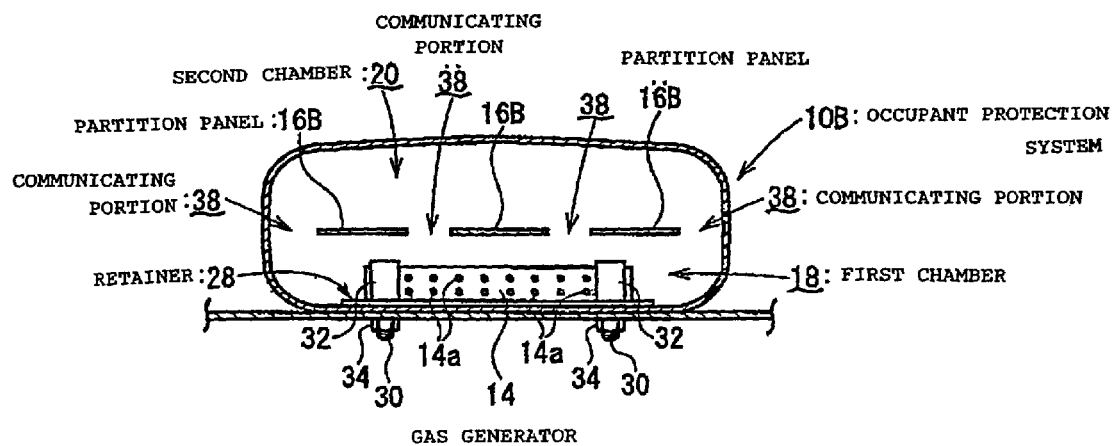
FIG. 3(b) is a cross-sectional view taken along line B-B of FIG. 3(a).

FIG. 3(a) is a horizontal sectional view of an airbag including a communicating portion according to another embodiment; and FIG. 3(b) is a cross-sectional view taken along line B-B of FIG. 3(a).

In an occupant protection system 10B shown in FIGS. 3(a) and 3(b), the airbag 12 includes multiple (three in this example) partition panels 16B having a small lateral width. The partition panels 16B connect the diametrically opposing surfaces of the airbag 12 together. Since the partition panels 16B are disposed laterally in multiple rows, the interior of the airbag 12 is partitioned into the upper and lower two chambers, the first chamber 18 and the second chamber 20, which extend from the left end to the right end of the airbag 12. Also between the partition panels 16B disposed at the lateral ends and the inner circumferences at the lateral ends of the airbag 12, specified clearances are provided.

In this embodiment, the clearance between the partition panels 16B and the clearances between the partition panels 16B at the lateral ends and the inner circumferences at the lateral ends of the airbag 12 serve as communicating portions (gas communicating spaces) 38 for communicating the lower first chamber 18 and the upper second chamber 20 with the arrangement of the partition panels 16B inbetween.

Other structures of the occupant protection system 10B are the same as those of the occupant protection system 10 in FIGS. 1(a) and 1(b).

Also in the occupant protection system 10B, the gas supplied from the gas generator 14 disposed in the first chamber 18 first flows into the first chamber 18 to inflate the first chamber 18 quickly from the left end of the airbag 12 to the right end and then the gas flows through the communicating portions 38 to inflate the entire second chamber 20 quickly.

Figure 4A:
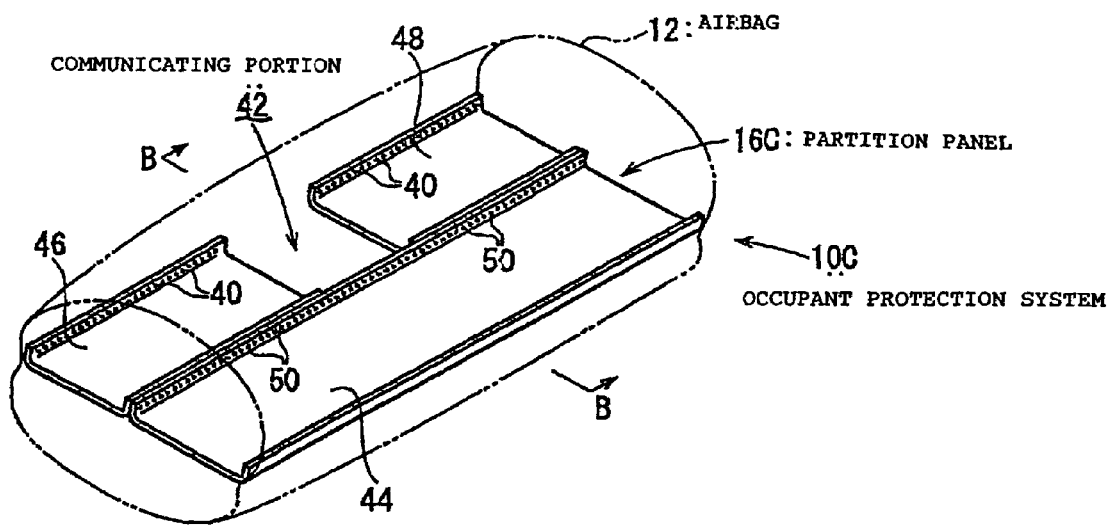
FIG. 4(a) is a perspective view of the airbag of an occupant protection system according to another embodiment.
Figure 4B:
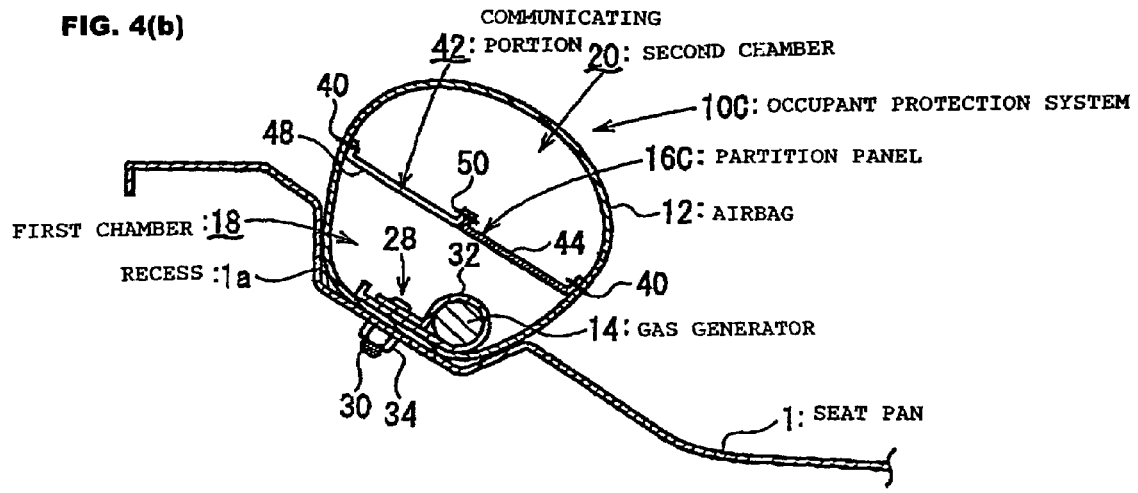
FIG. 4(b) is a cross-sectional view taken along line B-B of FIG. 2(a).

In the invention, one partition panel may be composed of multiple small pieces (small panels). FIG. 4(a) is a perspective view of an airbag of an occupant protection system 10C with such a structure; and FIG. 4(b) is a cross-sectional view taken along line B-B of FIG. 4(a).

Also in this occupant protection system 10C, the airbag 12 includes a partition panel 16C which connects diametrically opposing surfaces of the airbag 12 with each other. Reference numeral 40 indicates a seam that connects the opposite ends of the partition panel 16C with the inner surface of the airbag 12. The partition panel 16c extends laterally (along the length of the airbag 12) continuously. The partition panel 16C partitions the interior of the airbag 12 into the upper and lower chambers, the first chamber 18 and the second chamber 20, which extend from the left end of the airbag 12 to the right end.

In this embodiment, the partition panel 16C has a communicating portion (cutout) 42 which is cut out in the lateral middle of one side rim, through which the first chamber 18 formed under the partition panel 16C and the second chamber 20 thereon are communicated with each other.

The partition panel 16C according to the embodiment includes three small panels 44, 46, and 48 stitched together. Reference numeral 50 indicates a seam that stitches the small panels 44, 46, and 48 together. As shown in FIG. 4(a), the small panel 44 constructs a region from the middle of the partition panel 16C to one end in the direction of connection of the opposing surfaces of the airbag 12, while the small panels 46 and 48 construct regions from the middle to the other end. The small panels 46 and 48 are disposed at one end of the (lateral) length of the partition panel 16C and the other end along the side of the small panel 44, respectively. The small panels 46 and 48 are disposed apart from each other, the clearance of which serves as the communicating portion 42.

Other structures of the occupant protection system 10C are the same as those of the occupant protection system 10 in FIGS. 1(a) and 1(b).

According to the foregoing embodiments, as shown in the drawings, each partition panel is disposed to extend in parallel with the upper surface of the seat pan (in other words, such that the connecting direction of the opposing surfaces in the airbag by the partition panel is parallel with the upper surface of the seat pan) with the airbag in an inflated state. However, the arrangement of the partition panel is not limited to that.

Figure 5:
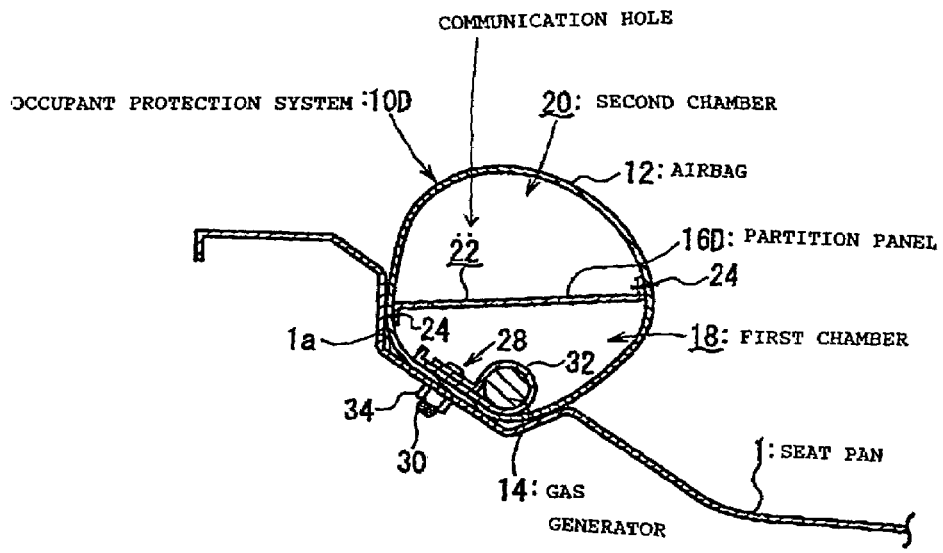
FIG. 5 is a vertical section of an occupant protection system according to another embodiment.
Figure 6:
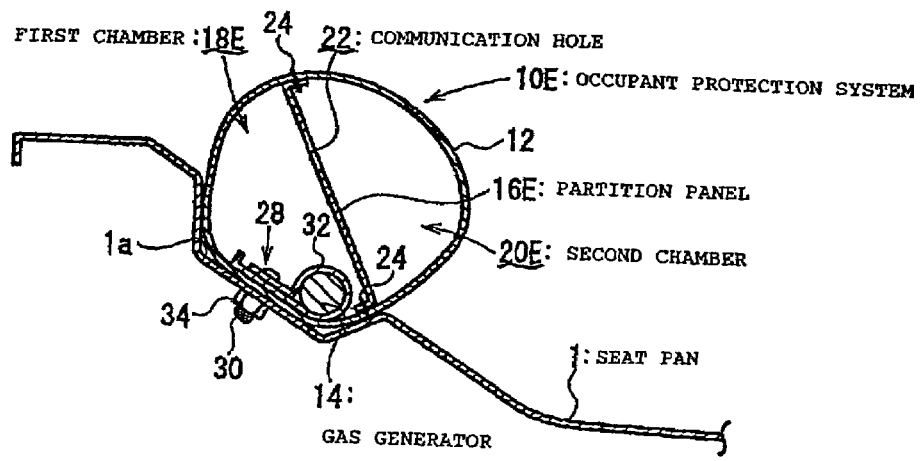
FIG. 6 is a vertical section of an occupant protection system according to another embodiment.

FIGS. 5 and 6 are vertical sections of occupant protection systems, showing other arrangements of the partition panel, respectively.

In an occupant protection system 10D of FIG. 5, a partition panel 16D extends horizontally when the airbag 12 inflates (also in the embodiments of FIGS. 5 and 6, the upper surface of the seat pan 1 inclines to rise forward, as in the foregoing embodiments.

In an occupant protection system 10E of FIG. 6, a partition panel 16E extends substantially vertically when the airbag 12 inflates. In this case, the front of the airbag 12 (adjacent to the front of the vehicle) with the partition panel 16E sandwiched therebetween serves as a first chamber 18E, while the rear (adjacent to the rear of the vehicle) serves as a second chamber 20E. The gas generator 14 is disposed in the first chamber 18E which is apart from the occupant.

In the occupant protection system 10E, in inflation of the airbag 12, gas supplied from the gas generator 14 first flows into the first chamber 18E to inflate the first chamber 18E laterally and vertically, then the gas flows into the second chamber 20E through a communicating portion (not shown) provided in the partition panel 16E to inflate the second chamber 20E toward the occupant.

Other structures of the occupant protection systems 10D and 10E are the same as those of the occupant protection system 10 in FIG. 1.

Figure 7A:
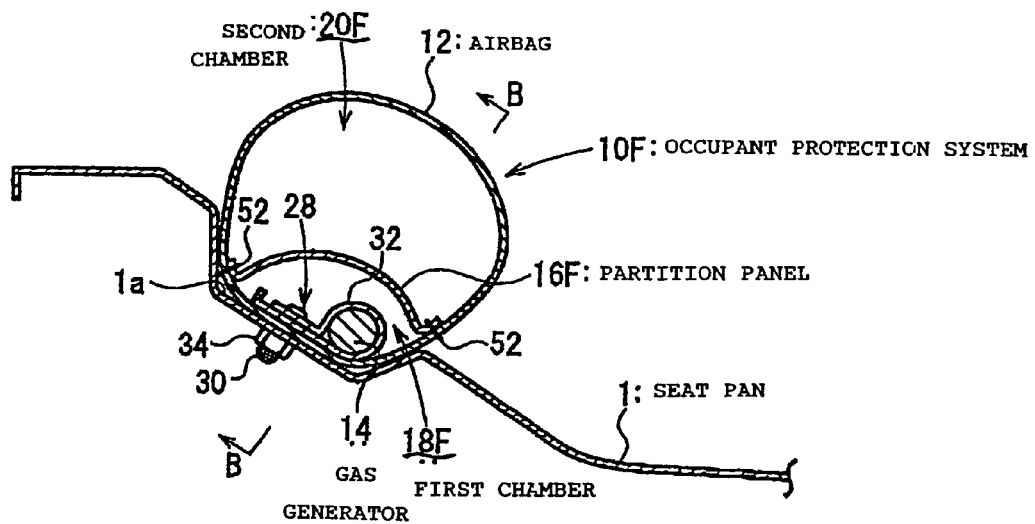
FIG. 7(a) is a vertical section of an occupant protection system according to another embodiment of the invention.
Figure 7B:
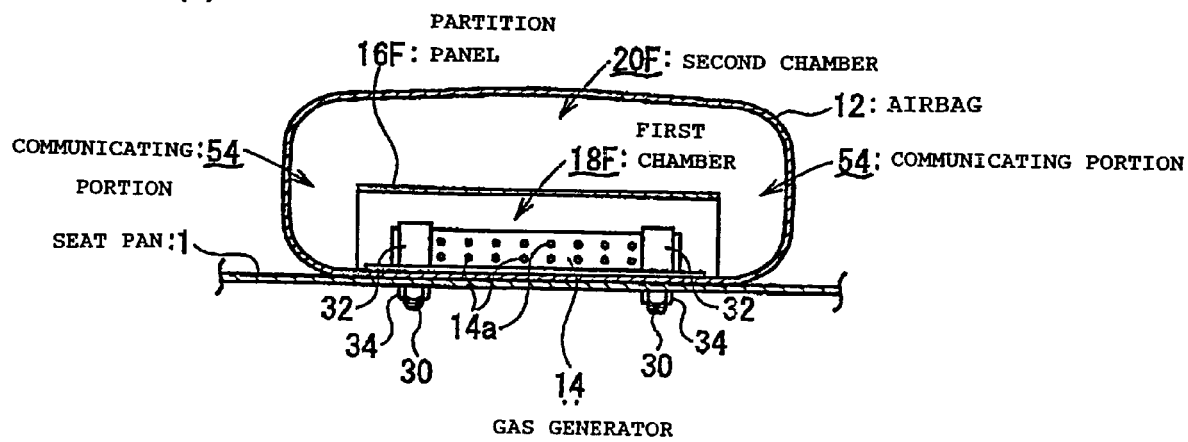
FIG. 7(b) is a cross-sectional view taken along line B-B of FIG. 7(a).

FIG. 7(a) is a vertical section of an occupant protection system, showing the arrangement of another partition panel; and FIG. 7(b) is a cross-sectional view taken along line B-B of FIG. 7(a).

In an occupant protection system 10F of FIGS. 7(a) and 7(b), partition panel 16F is disposed astride crosswise above the rod-like gas generator 14 which extends laterally along the inner surface of the bottom of the airbag 12, the front end and the rear end of which connect to the front and rear of the bottom of the airbag 12, respectively. Reference numeral 52 denotes the seam of the connection.

Briefly, the occupant protection system 10F includes a cylindrical first chamber 18F which extends laterally along the bottom of the airbag 12, which is surrounded by the bottom and the partition panel 16F. The remaining part in the airbag 12 serves as the second chamber 20F.

The partition panel 16F extends laterally (along the length of the airbag 12) continuously. As shown in FIG. 7(b), the lateral length of the partition panel 16F is smaller than that of the airbag 12. The lateral ends of the partition panel 16F are apart from the inner surfaces of the right and left ends of the airbag 12. Accordingly, the clearances between the lateral ends of the partition panel 16F and the inner surfaces at the lateral ends of the airbag 12 serve as communicating portions (vent spaces) 54 for communicating the first chamber 18F and the second chamber 20F.

Other structures of the occupant protection system 10F are the same as those of the occupant protection system 10 in FIGS. 1(a) and 1(b).

In this occupant protection system 10F, the first chamber 18F forms a cylindrical space which extends laterally. Accordingly, the gas emitted from the gas generator 14 into the first chamber 18F is guided laterally by the rectifying action of the first chamber 18F. This further speeds up lateral inflation of the airbag 12.

Although the foregoing embodiments include a partition panel separate from a panel that constructs the outer shell of the airbag, the partition panel may be integrated with the panel of the outer shell of the airbag.

FIGS. 8 to 11 are vertical sections of occupant protection systems in which the panel of the outer shell of the airbag is integrated with the partition panel.

Figure 8:
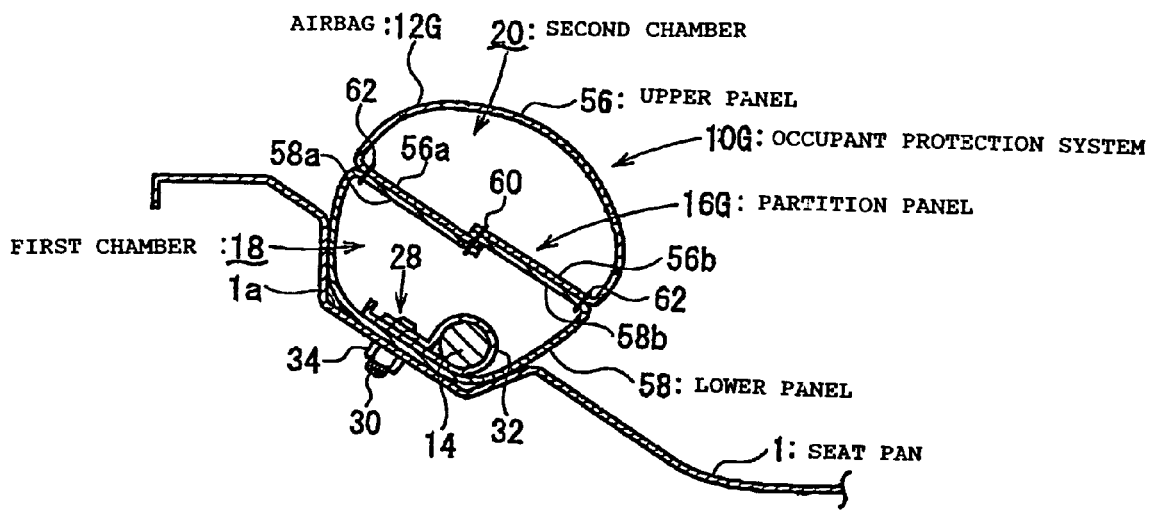
FIG. 8 is a vertical section of an occupant protection system according to another embodiment.

In an occupant protection system 10G of FIG. 8, the outer shell of an airbag 12G is composed of two panels, an upper panel 56 and a lower panel 58. Tongue-shaped panel halves 56a and 56b and 58a and 58b of the partition panel 16G project from the front rim and the rear rim of the upper panel 56 and the lower panel 58, respectively. The panel halves 56a and 56b and 58a and 58b are integrated with the panels 56 and 58, respectively.

In this embodiment, the panel halves 56a and 56b and 58a and 58b are folded into the interior of the airbag 12G. The respective panel halves 56a and 58a at the front rim of the upper panel 56 and the lower panel 58 are fold up and, the respective panel halves 56b and 58b at the rear rim of the upper panel 56 and the lower panel 58 are fold up, and the ends of the folded panel halves are joined together to construct the partition panel 16G in the airbag 12G. Reference numeral 60 denotes the seam of the connection.

A seam 62 extends around the peripheries of the upper panel 56 and the lower panel 58 while passing through the respective base ends of the two-layered panel halves 56a and 58a and 56b and 58b and as such, the upper panel 56 and the lower panel 58 are stitched up into a bag to construct the outer shell of the airbag 12G.

Figure 9:
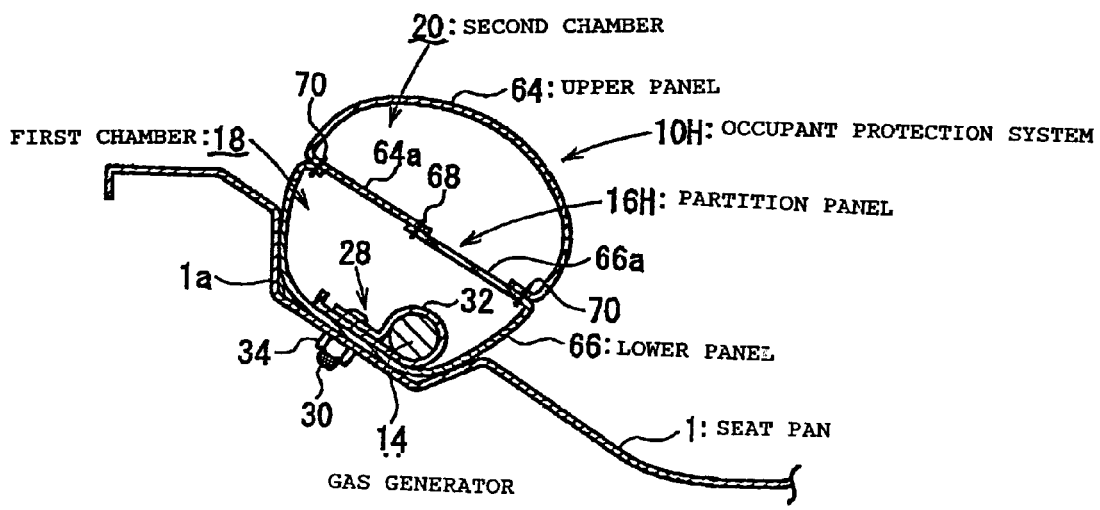
FIG. 9 is a vertical section of an occupant protection system according to another embodiment.

Also in an occupant protection system 10H of FIG. 9, the outer shell of an airbag 12H is composed of two panels, an upper panel 64 and a lower panel 66. In this embodiment, tongue-shaped panel halves 64a and 66a of the partition panel 16H project from the front rim of the upper panel 64 and the rear rim of the lower panel 66, respectively.

In this embodiment, the panel halves 64a and 66a are folded into the interior of the airbag 12H. The ends of the folded panel halves are joined together to construct the partition panel 16H in the airbag 12H. Reference numeral 68 denotes the seam of the connection.

A seam 70 extends around the peripheries of the upper panel 64 and the lower panel 66, with the rear rim of the upper panel 64 agreed with the base end of the panel half 66a, and the front rim of the lower panel 66 agreed with the base end of the panel half 64a and as such, the upper panel 64 and the lower panel 66 are stitched up into a bag to construct the outer shell of the airbag 12H.

Figure 10:
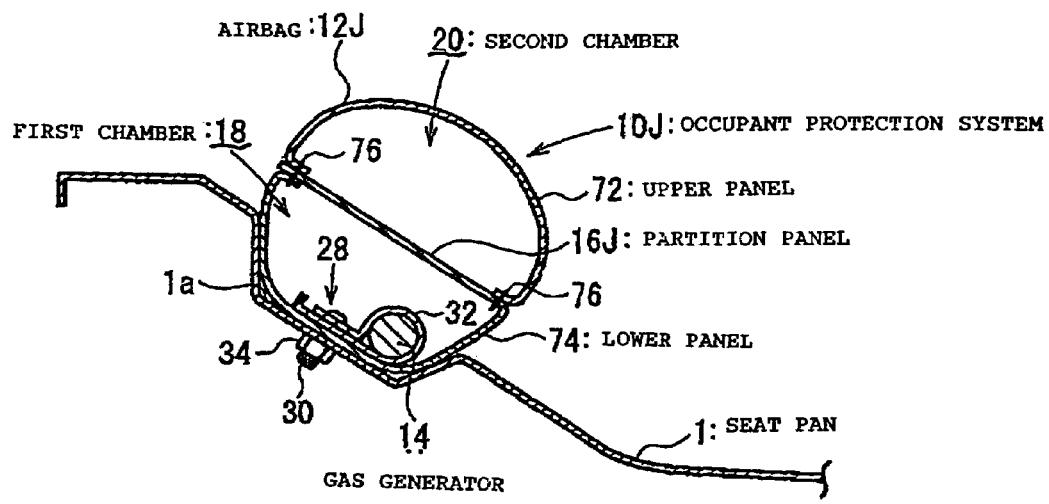
FIG. 10 is a vertical section of an occupant protection system according to another embodiment.

Also in an occupant protection system 10J of FIG. 10, the outer shell of an airbag 12J is composed of two panels, an upper panel 72 and a lower panel 74. In this embodiment, a tongue-shaped partition panel 16J integrated with the lower panel 74 projects from the rear rim of the lower panel 74.

In this embodiment, the partition panel 16J is folded into the interior of the airbag 12J, the end of which is joined with the front rims of the upper panel 72 and the lower panel 74 to construct the partition panel 16J in the airbag 12J. Reference numeral 76 denotes the seam of the connection.

The seam 76 also connects the peripheries of the upper panel 72 and the lower panel 74 with each other. Specifically, the seam 76 extends around the peripheries of the upper panel 72 and the lower panel 74, with the rear rim of the upper panel 74 agreed with the base end of the partition panel 16J, and the front rims of the upper panel 72 and the lower panel 74 and the end of the partition panel 16J folded into three layers and as such, the partition panel 16J is constructed in the airbag 12J and the upper panel 72 and the lower panel 74 are stitched up into a bag to construct the outer shell of the airbag 12J.

Figure 11:
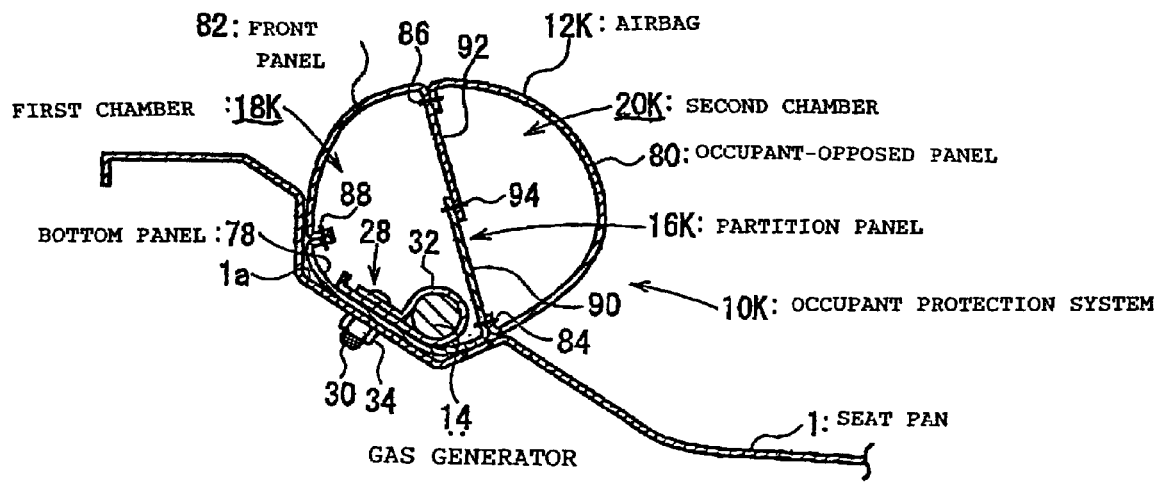
FIG. 11 is a vertical section of an occupant protection system according to another embodiment.

In an occupant protection system 10K of FIG. 11, the outer shell of an airbag 12K is composed of three panels, a bottom panel 78, an occupant-opposed panel 80, and a front panel 82.

Reference numerals 84, 86, and 88 indicate seams that join the side rims of the bottom panel 78 and the occupant-opposed panel 80, the side rims of the occupant-opposed panel 80 and the front panel 82, and the side rims of the front panel 82 and the bottom panel 78, respectively.

In this embodiment, tongue-shaped panel halves 90 and 92 of a partition panel 16K project from the side rim of the bottom panel 78 adjacent to the occupant-opposed panel 80 and from the side rim of the front panel 82 adjacent to the occupant-opposed panel 80, respectively. The panel halves 90 and 92 are folded into the interior of the airbag 12K, the ends of which are joined together to construct the partition panel 16K in the airbag 12K. Reference numeral 94 denotes the seam of the connection.

The side rim of the occupant-opposed panel 80 adjacent to the bottom panel 78 is agreed with the base end of the panel half 90 and joined thereto with the seam 84. The side rim of the occupant-opposed panel 80 adjacent to the front panel 82 is agreed with the base end of the panel half 92 and joined thereto with the seam 86.

As shown in the drawing, the partition panel 16K according to this embodiment extends substantially vertically, with the airbag 12K inflated on the seat pan 1. A first chamber 18K is disposed at the front, while a second chamber 20K is disposed at the rear (adjacent to the occupant) with the partition panel 16K inbetween.

Although the interior of the airbags according to the foregoing embodiments is partitioned into a first chamber and another chamber (second chamber), the invention may be constructed such that two or more chambers are provided in addition to the first chamber.

Figure 12A:
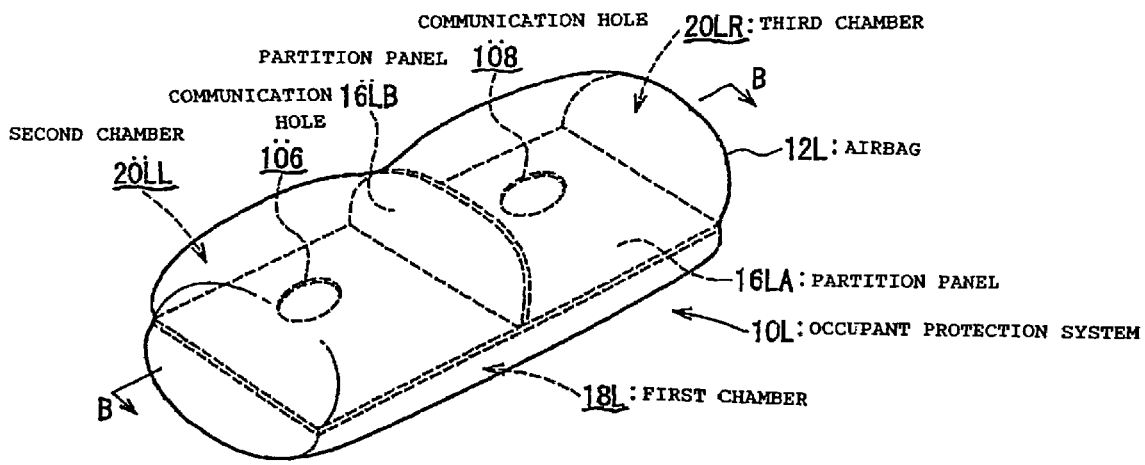
FIG. 12(a) is a perspective view of an occupant protection system according to another embodiment.
Figure 12B:
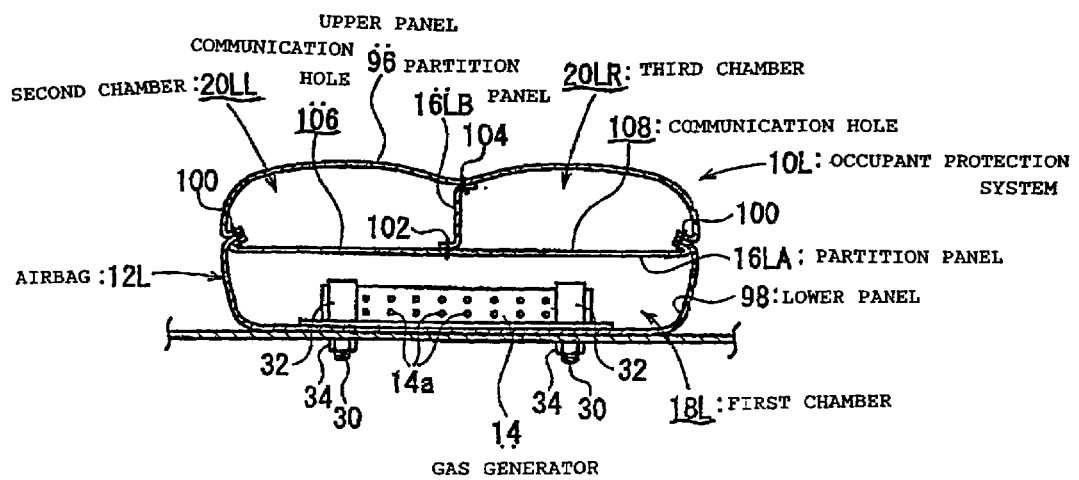
FIG. 12(b) is a cross-sectional view taken along line B-B of FIG. 12(a).

FIG. 12(a) is a perspective view of an occupant protection system 10L with such a structure; and FIG. 12(b) is a cross-sectional view taken along line B-B of FIG. 12(a).

In the occupant protection system 10L of FIGS. 12(a) and 12(b), the inner space of an airbag 12L is partitioned into the lower part and the upper part by a laterally extending partition panel 16LA, in which the upper part of the airbag 12L is partitioned into the left and right chambers by a partition panel 16LB disposed in the middle of the length of the airbag 12L. A space lower than the partition panel 16LA serves as a first chamber 18L extending from the left end of the airbag 12L to the right end. Of the space above the partition panel 16LA, the left half and the right half with the partition panel 16LB inbetween serve as a second chamber 20LL and a third chamber 20LR, respectively.

The outer shell of the airbag 12L according to this embodiment is composed of an upper panel 96 and a lower panel 98. The entire outer rim of the partition panel 16LA is stitched with the entire peripheries of the upper panel 96 and the lower panel 98. Reference numeral 100 denotes the seam of the connection. In this embodiment, the peripheries of the upper panel 96 and the lower panel 98 are also stitched together to construct the outer shell of the bag-shaped airbag.

Reference numerals 102 and 104 denote seams that join the lower rim and the upper periphery of the partition panel 16LB with the partition panel 16LA and the upper panel 96, respectively.

The left half and the right half of the partition panel 16LA have communication holes 106 and 108 for communicating the first chamber 18L with the second chamber 20LL, and the first chamber 18L with the third chamber 20LR, respectively.

Although the second chamber 20LL and the third chamber 20LR in this embodiment are not communicated with each other, they may be communicated with each other through a communication hole etc. provided in the partition panel 16LB.

Other structures of the occupant protection system 10L are the same as those of the occupant protection system 10 in FIGS. 1(a) and 1(b).

In inflating the airbag 12L of the occupant protection system 10L, the gas supplied from the gas generator 14 first flows into the first chamber 18L which extends from the left of the airbag 12L to the right end to inflate the first chamber 18L. Then the gas flows through the communication holes 106 and 108 into the second chamber 20LL and the third chamber 20LR to inflate the second chamber 20LL and the third chamber 20LR.

In the occupant protection system 10L, even when a large load is applied from the occupant to the chambers 20LL and 20LR at the upper part of the airbag 12L, the inner pressure in each chamber increases to prevent the upper panel 96 from partial deformation. Thus the both legs of the occupant can be received evenly.

Although the gas generator according to the foregoing embodiments is disposed inside the airbag, it may be disposed outside the airbag. FIG. 13 is a perspective view of an occupant protection system 10M with such a structure.

In the occupant protection system 10M of FIG. 13, a partition panel 16M extends substantially vertically in an airbag 12M, with the airbag 12M inflated on a seat pan (not shown). A first chamber 18M is disposed on the front and a second chamber 20M is disposed on the rear (adjacent to the occupant) with the partition panel 16M inbetween. The partition panel 16M has multiple communication holes 110 laterally at equal intervals for communicating the first chamber 18M with the second chamber 20M.

In this embodiment, a gas inlet 112 is provided at a longitudinal end of the airbag 12M, which communicates with the interior of the first chamber 18M. Gas is supplied from a gas generator 14M into the first chamber 18M through a pipe 114 connected to the gas inlet 112.

The gas generator 14M according to the embodiment has a cylindrical casing, at one end of which a gas port (not shown) is provided. One end of the pipe 114 is connected to the gas port of the gas generator 14M, while the other end is connected to the gas inlet 112 of the airbag 12M.

In this embodiment, an ear-shaped airbag mounting piece 116 projects from each of the longitudinal ends of the airbag 12M. The airbag mounting pieces 116 are fastened to the seat pan with bolts through respective bolt insertion holes 116a, so that the airbag 12M is fixed to the seat pan.

Since the gas generator 14M of the occupant protection system 10M is disposed outside the airbag 12M, the thickness of the airbag 12 in a folded state is small, thus preventing or restricting a decrease of comfortability of the seat due to the occupant protection system 10M.

Figure 14:
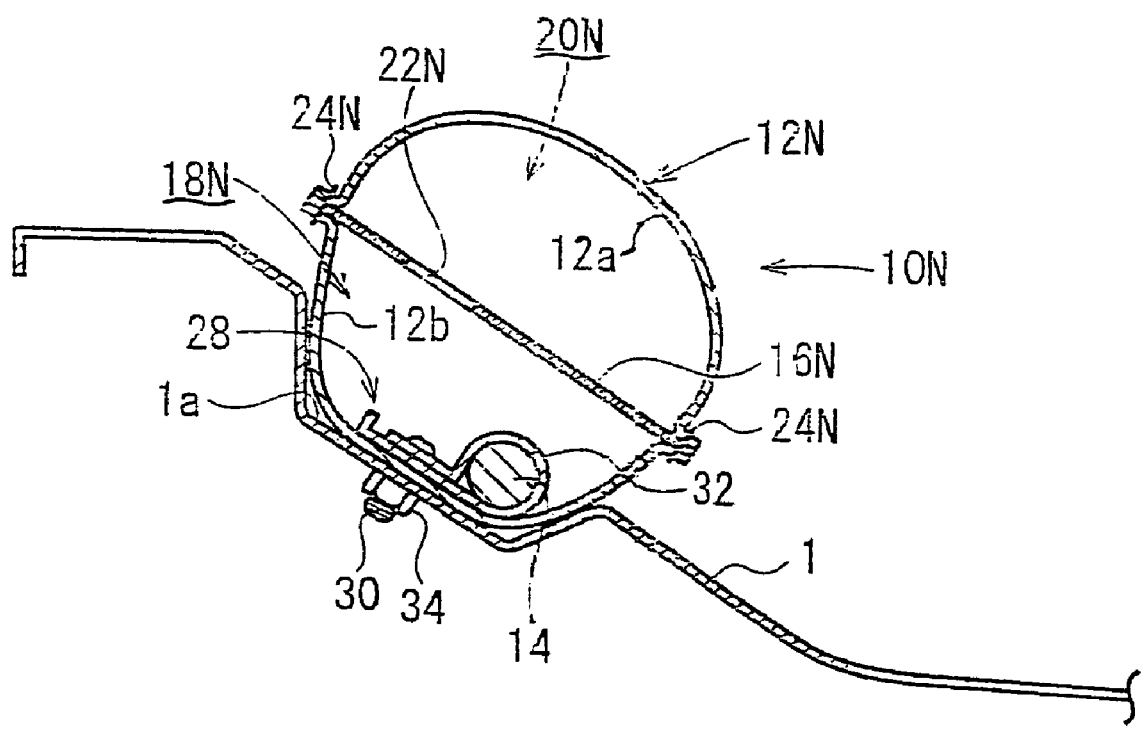
FIG. 14 is a vertical section of an occupant protection system according to another embodiment.

FIG. 14 is a longitudinal section of an airbag according to another embodiment.

In an occupant protection system 10N of FIG. 14, an airbag 12N includes three panels, an upper panel 12a and a lower panel 12b that construct the outer shell of the airbag 12N and a partition panel 16N for partitioning the interior of the airbag 12N into a first chamber 18N adjacent to the seat pan and a second chamber 20N adjacent to the seat surface. The partition panel 16N has a communication hole 22N for communicating the first chamber 18N and the second chamber 20N with each other.

In manufacturing the airbag 12N, the partition panel 16N is disposed between the upper panel 12a and the lower panel 12b into three layers, and the peripheries of the three panels 12a, 16N, and 12b are stitched together. Reference numeral 24N denotes the seam of the stitch.

In stitching, the three panels 12*a*, 16N, and 12*b* may only be sewn flat with the peripheries placed in three layers, so that the airbag 12N can be manufactured very easily.

Other structures of the occupant protection system 10N are the same as those of the occupant protection system 10 in FIG. 1. The same numerals in FIG. 14 as those of FIG. 1 denote the same components.

Figure 15A:
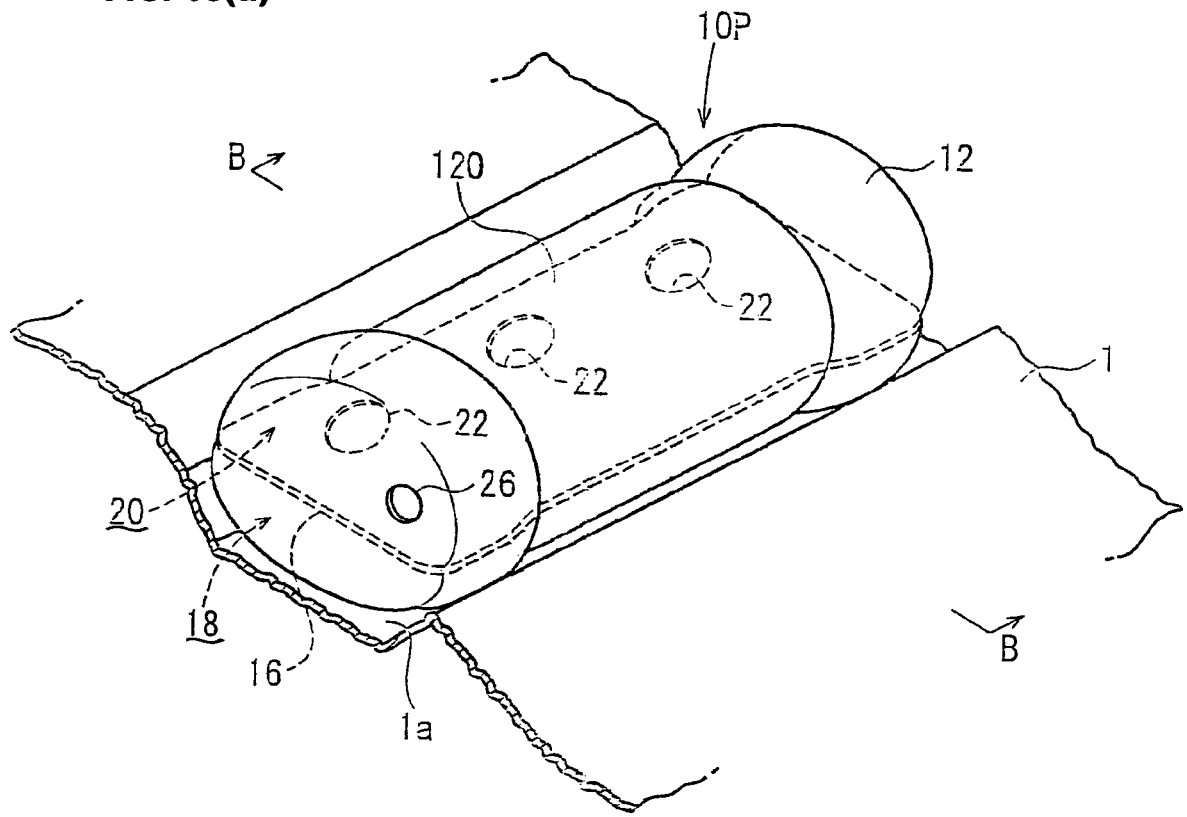
FIG. 15(a) is a perspective view of an occupant protection system according to another embodiment.
Figure 15B:
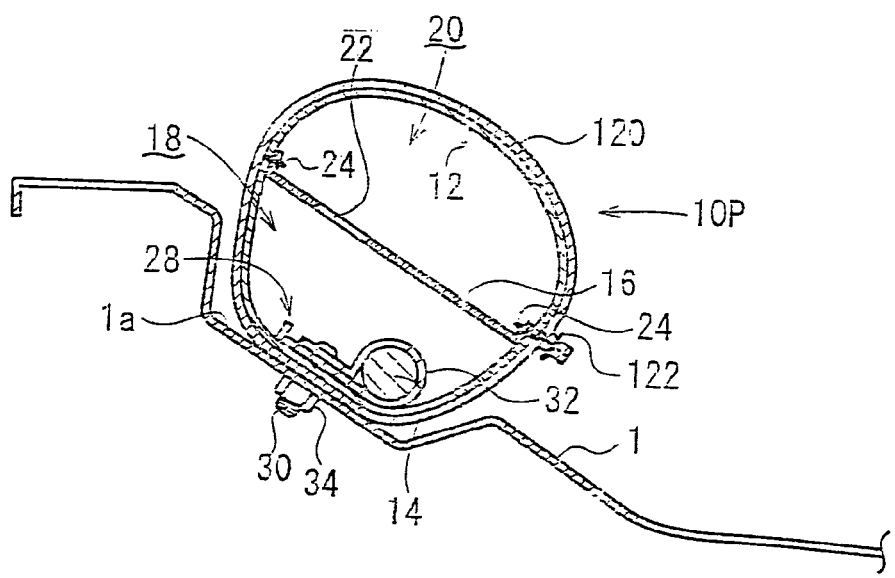
FIG. 15(b) is a cross-sectional view taken along line B-B of FIG. 15(a).

FIG. 15(*a*) is a perspective view of an occupant protection system according to another embodiment. FIG. 15(*b*) is a sectional view taken along line B-B of FIG. 15(*a*).

The occupant protection system 10P of FIGS. 15(*a*) and 15(*b*) includes an airbag enclosure 120 that encloses the airbag 12 along the circumference, in the center of the length of the airbag 12 extending along the lateral width of the seat. In this embodiment, the airbag enclosure 120 is formed in such a manner that a sheet-like wide material with a specified width is rolled up, one rim and the other rim of which are stitched together into a cylindrical shape. Reference numeral 122 denotes the seam of the stitch.

The circumferential length of the airbag enclosure 120 is smaller than that of the center of the airbag 12 in a freely inflated state.

It is preferable that the sheet-like material of the airbag enclosure 120 hardly extend or do not extend at all along the circumference of the airbag enclosure 120. The sheet-like material may be a relatively soft material such as cloth, a synthetic resin sheet, or a synthetic-resin mesh sheet, or alternatively, a hard material such as a metal plate or a metal mesh.

The occupant protection system 10P has the same structure as the airbag 10 of FIGS. 1(*a*) and 1(*b*), except that it includes the airbag enclosure 120. Specifically speaking, the airbag 12 includes the retainer 28 therein and the stud bolts 30 projecting from the lower surface of the retainer 28 extends to the exterior (below) the airbag 12 through the lower surface of the airbag 12. In this embodiment, the stud bolts 30 also pass through the airbag enclosure 120 that encloses the airbag 12. Since the stud bolts 30 are passed through the seat pan 1 and tightened with the nuts 34, the airbag enclosure 120 is fastened to the seat pan 1 together with the airbag 12.

With this occupant protection system 10P, the airbag enclosure 120 shorter in circumferential length than the freely inflated airbag 12 encloses the center of the length of the airbag 12. Accordingly, when the airbag 12 inflates, the length of the center of the airbag 12 remains within the circumferential length of the airbag enclosure 120. This prevents the center of the airbag 12 from inflating upward excessively and accelerates the increase of the inner pressure of the airbag 12 to inflate the airbag 12 quickly to both ends of the length of the airbag 12.

Figure 16:
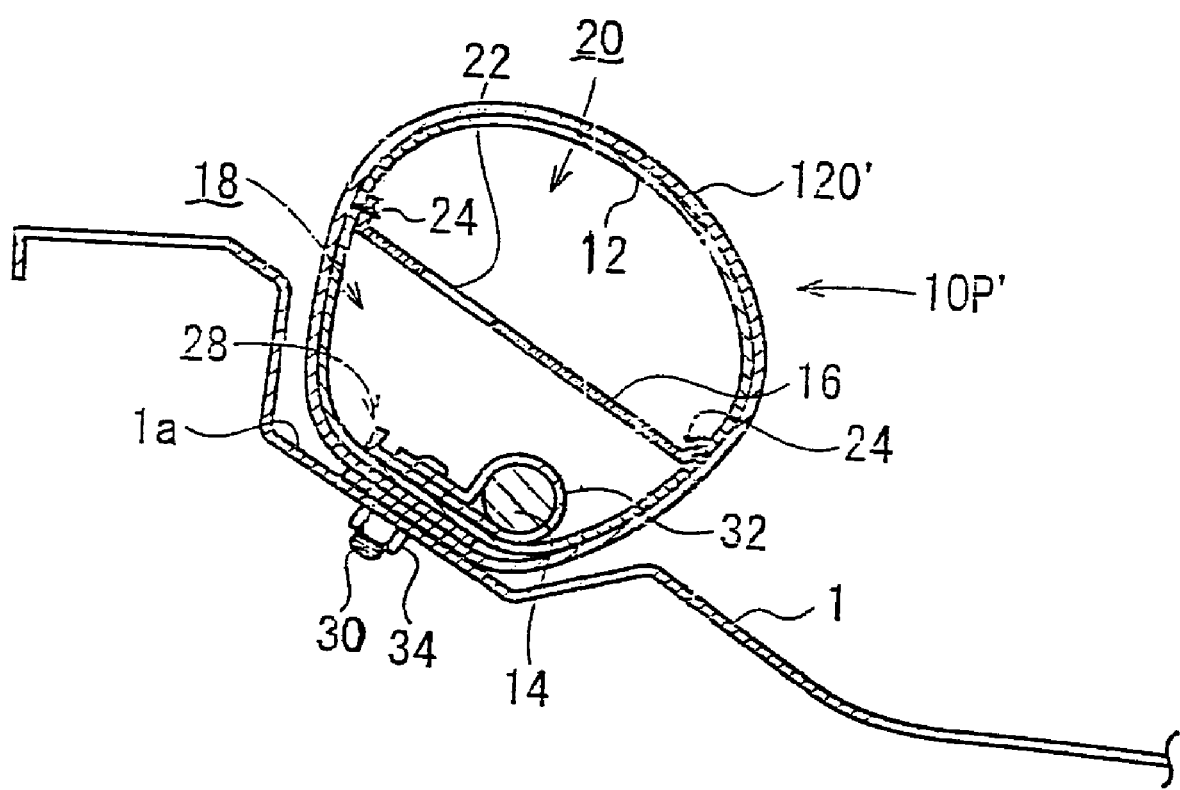
FIG. 16 is a vertical section of an occupant protection system according to another embodiment.

FIG. 16 is a longitudinal section of another structural example of the bag enclosure.

An occupant protection system 10P' of FIG. 16 has an airbag enclosure 120' that encloses the airbag 12. The airbag enclosure 120' is formed in such a manner that a sheet-like material is wound around the outer circumference of the airbag 12, both rims of which are fixed such that they are hooked on the stud bolts 30 extending from the lower surface of the airbag 12 downward. Other structures of the occupant protection system 10P' are the same as those of the occupant protection system 10P in FIGS. 15(*a*) and 15(*b*).

The structure of the bag enclosure is not limited to that in the drawing. Although the bag enclosures of the foregoing embodiments are shaped like a cylinder with a wide width, they may be shaped like a ring with a small width. The bag enclosure may be disposed only at one place (e.g., at the center) of the length of the airbag or at multiple places.

When the airbag has therein a partition panel extending vertically, by which the upper surface and the lower surface of the airbag are connected together, as in the embodiments of FIGS. 11 to 13, the same advantages as in the case of including the bag enclosure can be offered even without the bag enclosure.

It is to be understood that the foregoing embodiments are only examples of the present invention and the invention is not limited to the foregoing embodiments.

What is claimed is:

1. An airbag device for use with a vehicle seat, the airbag device comprising:
   an airbag for being disposed below the seat and having a length for extending laterally across the seat and an elongate, hollow internal space having a generally cylindrical configuration;
   a gas generator disposed in the airbag and having an elongate configuration arranged in the airbag to extend lengthwise along the length of the airbag, the gas generator including gas ports spaced along the length of the gas generator that discharge gas therefrom for inflating the elongate, hollow internal space of the airbag;
   an internal panel attached in the airbag internal space to extend along the length thereof forming one chamber in the airbag in which the gas generator is disposed and at least one other chamber in the airbag and constructed to distribute gas flow so that the airbag is inflated along the length thereof at substantially the same time;
   end portions of the inflated airbag along the length thereof that have a substantially symmetrical configuration relative to each other so that the end portions are inflated to project upwardly together in an even manner for pushing both sides of the seat upwardly substantially equally by the evenly inflated airbag end portions;
   communication openings between the airbag chambers spaced along the length of the airbag to distribute gas flow from the one chamber to the other chamber along the airbag length at substantially the same time so that end portions of the airbag are evenly inflated; and
   opposite sides of the internal panel connected to diametrically opposite portions of the airbag with the opposite internal sides defining a predetermined panel width therebetween that is sized to be smaller than a widthwise, diametrical distance across the generally cylindrical, airbag internal space between the diametrical opposite portions thereof, to restrict separation of the diametrical portions upon airbag inflation for reducing size of the inflated airbag therebetween.

2. The airbag device of claim 1, wherein, the panel is attached to the airbag to divide the internal space into the chambers with the one chamber being smaller than the other chamber, and the gas generator is in the smaller chamber.

3. The airbag device of claim 1, wherein the panel extends for the length of the airbag and has the communication openings formed therein spaced longitudinally from each other.

4. The airbag device of claim 1, wherein the panel has a length that is less than the length of the airbag.

5. The airbag device of claim 1, wherein the airbag has longitudinally spaced ends one at each end portion, and the panel extends about the gas generator and has ends adjacent to the corresponding airbag ends.

6. The airbag device of claim 1, wherein the airbag is formed from at least one airbag panel that is integrated with the internal panel.

7. The airbag device of claim 1, wherein the airbag has an internal space, and the panel comprises a first panel extending along the length of the airbag to divide the internal space into upper and lower chambers with the lower chamber comprising the one chamber in which the gas generator is disposed and a second panel extending transverse to the airbag length in the upper chamber to divide the upper chamber into two subchambers.

8. The airbag device of claim 1, wherein the airbag has ends spaced lengthwise from each other, one at each end portion, and the communication openings are adjacent the airbag ends.

9. The airbag device of claim 1, wherein the airbag diametrically opposite portions are front and rear sides of the airbag extending along the length of the airbag, and the opposite sides of the internal panel are attached to the airbag front and rear sides to restrict airbag expansion in a fore and aft direction.

10. The airbag device of claim 1, wherein the airbag has an intermediate portion between the end portions along the length thereof, and an enclosure extending about the airbag intermediate portion to restrict expansion thereof so that the airbag end portions are quickly inflated.

* * * * *